United States Patent [19]
Muller, Jr. et al.

[11] 3,854,637
[45] Dec. 17, 1974

[54] APPARATUS FOR LOADING SOLID PARTICLES INTO A VERTICAL VESSEL

[75] Inventors: Karl A. Muller, Jr., Homewood, Ill.;
Lyle M. Lovell, Portage, Ind.;
Walker F. Johnston, Flossmoor;
Gerald J. Kramer, South Holland, both of Ill.

[73] Assignee: Standard Oil Company, Chicago, Ill.

[22] Filed: July 20, 1973

[21] Appl. No.: 381,042

[52] U.S. Cl. .............................................. 222/564
[51] Int. Cl. ............................................. B67d 3/00
[58] Field of Search ........... 222/173, 195, 564, 470, 222/460, 464, 414; 214/17 C; 221/464; 302/56, 61, 63, 60; 141/67, 286; 239/590, 502

[56] References Cited
UNITED STATES PATENTS

| | | | |
|---|---|---|---|
| 1,674,391 | 6/1928 | Dunnagan | 222/193 |
| 1,960,797 | 5/1934 | Sackett | 222/464 UX |
| 2,057,768 | 10/1936 | DeMotte | 222/410 X |
| 3,232,458 | 2/1966 | Freeman | 222/410 X |
| 3,485,536 | 12/1969 | Donelson, Jr. | 302/60 |
| 3,537,623 | 11/1970 | Fisher | 222/460 |

*Primary Examiner*—Stanley H. Tollberg
*Assistant Examiner*—Norman L. Stack, Jr.
*Attorney, Agent, or Firm*—James L. Wilson; Arthur G. Gilkes; William T. McClain

[57] ABSTRACT

The apparatus comprises: (1) a hollow first cylinder having an inlet end at its top and an outlet end at its bottom and having its axis in a vertical position; (2) a first baffle means located in said first cylinder near said inlet end and being positioned co-axially with said first cylinder, the diameter of said first baffle means being smaller than the inner diameter of said first cylinder; (3) a second baffle means located directly below said outlet end and being positioned co-axially with said first cylinder, the diameter of said second baffle means being at least as large as the inner diameter of said first cylinder; and (4) third baffle means being co-axial with said first cylinder and having its top connected to the bottom of said first baffle means and its bottom connected to the upper surface of said second baffle means and its vertical sides connected to the inner wall of said first cylinder.

In a preferred embodiment, a support having a plurality of deflecting vanes extending downwardly therefrom and being positioned with one another along the periphery of a circle is connected to the cylinder near its outlet end and such vanes may be positioned at angles with the vertical and/or with the tangents of said circle.

A plurality of gas jets may be used to disperse solid particles at said second baffle means and said second baffle means may comprise a conical section, a horizontal plate section, or both.

12 Claims, 11 Drawing Figures

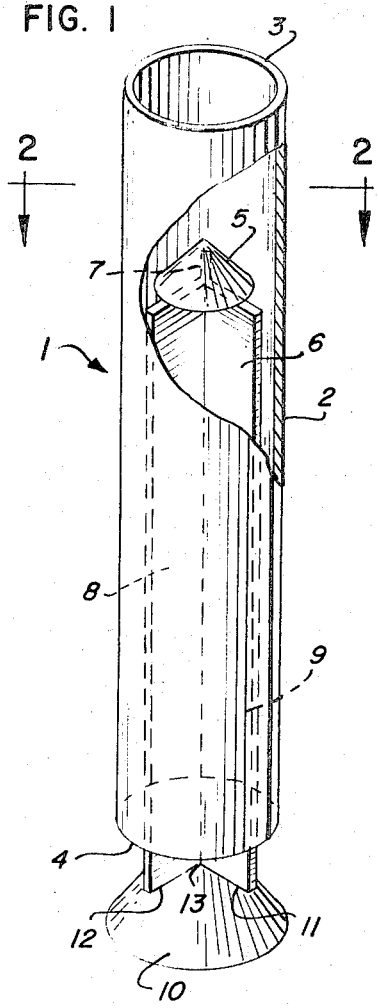
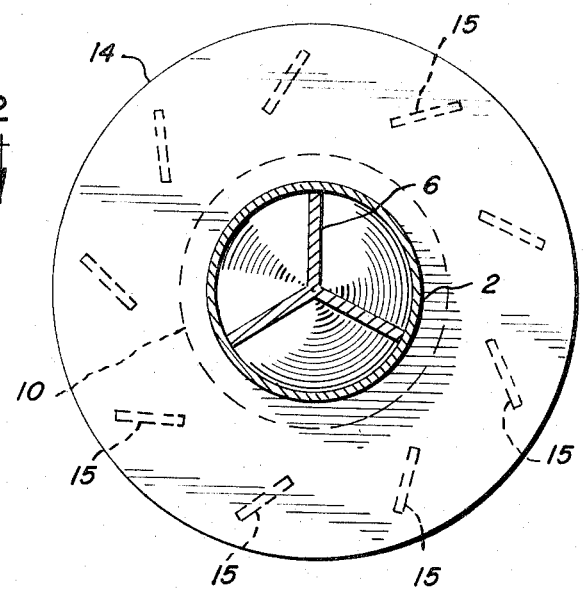
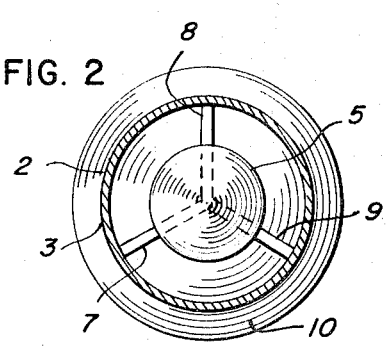
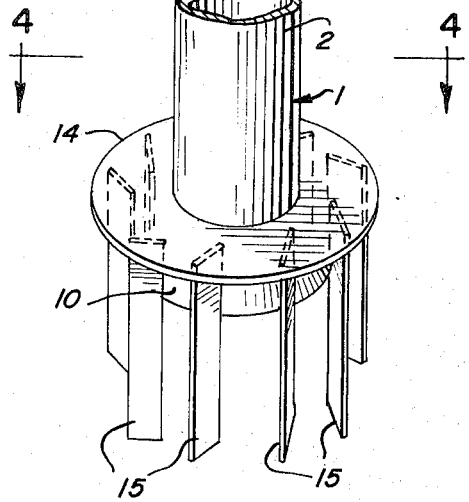

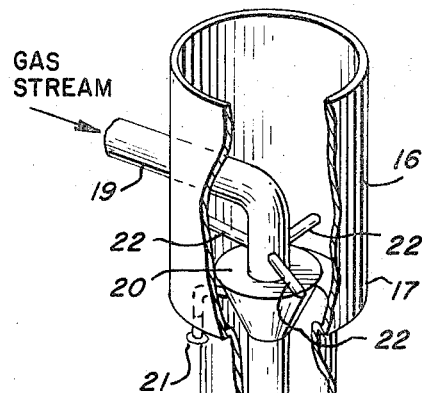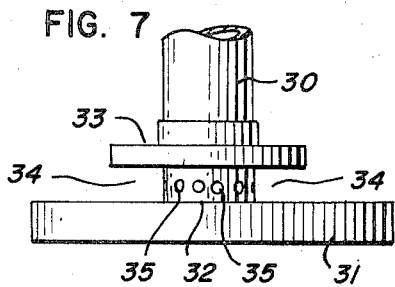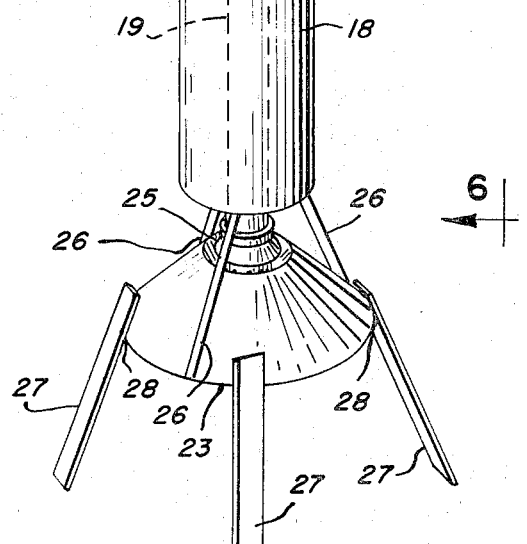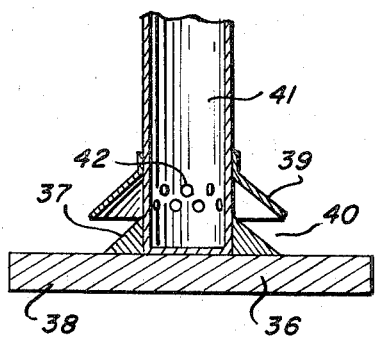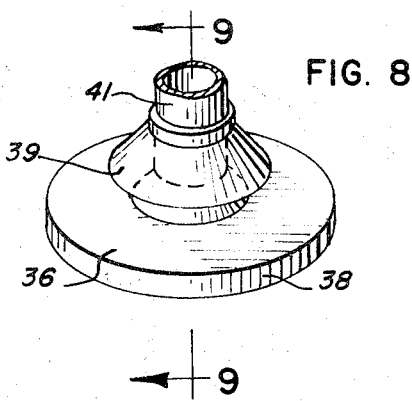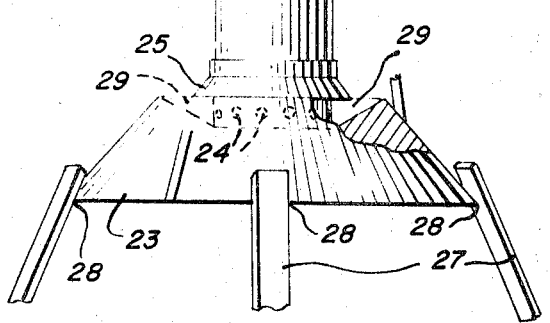

APPARATUS FOR LOADING SOLID PARTICLES INTO A VERTICAL VESSEL

BACKGROUND OF THE INVENTION

There are many situations in which small particles are charged or loaded into a vertical vessel to form single or multiple beds of the particles. For example, solid adsorbents or packing may be charged to a column or solid catalysts may be charged to a reactor. In the past, such solid materials have been charged to the vessel by various methods, such as loading bucket, pouring, or the "sock" method. By this "sock" method, a hopper containing the solid particles is connected to the vessel to be charged by an attached hose, which hose extends down into the reactor near its bottom or to the surface of the solid particles being introduced into the vessel. The solid particles are released from the bottom of the hose by elevating slowly the hose. The bed of solid particles that is formed in the vessel develops a cone at its upper surface. As the solid particles are loaded into the vessel, the bed of solid particles is more or less uniformly distributed over the cross-sectional area of the vessel by raking. By this method of loading into a vessel, such as a reactor, solid particles, such as catalyst particles, voids will inherently from in the bed as it is produced in the vessel. Such voids result in non-uniform bed densities. The cone can be avoided by having a man slowly guide the bottom of the hose or sock and uniformly fill the reactor; however, non-uniform densities still occur and there is also the breakage of catalyst particles.

It has been said that the "sock" method necessitates loading times that are longer than those that would normally be encountered because the hose that is connected to the hopper and through which the solid particles enter the vessel must be continually adjusted in an upward direction in order to permit the solid particles to flow through and out of the hose and hopper. The disadvantages of the formation of the cone, non-uniform densities in the bed of catalyst, and the increased time required for loading, necessitate that improved methods for loading solid particles into vessels be attained.

Now an apparatus has been developed, which apparatus may be employed to charge solid particles into a vertical vessel. Such loading of particles results in beds of particles having increased and more uniform densities. The apparatus is particularly useful in charging catalyst particles into a reactor, no matter what shape or geometry the particles have. They may be spherical or have a substantial cylindrical geometry and may be either pelleted or extruded.

SUMMARY OF THE INVENTION

Broadly, according to the invention, there is provided an apparatus for distributing solid particles into a vertical vessel when said particles are being loaded into said vessel. This apparatus is designed for use when employed in a substantially vertical position. In its broadest embodiment, the apparatus comprises: (1) a hollow first cylinder having an inlet end at its top and an outlet end at its bottom and having its axis in a vertical position when in use; (2) a first baffle means located in said cylinder near said inlet end and being positioned co-axially with said first cylinder, the diameter of said first baffle means being smaller than the inner diameter of said first cylinder; (3) a second baffle means located directly below said outlet end and being positioned co-axially with said first cylinder, the diameter of said second baffle means being at least as large as the inner diameter of said first cylinder; and (4) a third baffle means being co-axial with said cylinder and having its top connected to the bottom of said first baffle means and its bottom connected to the upper surface of said second baffle means and its vertical sides connected to the inner wall of said first cylinder. In one embodiment, the third baffle means is a three-sided vertical baffle, the angle between adjacent sides of said vertical baffle being 120°.

In another embodiment of the apparatus of the present invention, the apparatus may further comprise a support connected co-axially to said first cylinder near said outlet end and a plurality of deflecting vanes connected to said support and extending in a downward direction therefrom and being positioned with one another along the periphery of a horizontal circle, said deflecting vanes being positioned such that a portion of said particles coming from said outlet end of said first cylinder and contacting the upper surface of said second baffle means will be directed against and deflected from said deflecting vanes in such a manner as to fall evenly and uniformly over the cross-sectional area of said vertical vessel. In an embodiment of the apparatus of the present invention, the deflecting vanes are capable of being positioned to provide either angles between such vanes and the vertical and/or angles with the tangents of said horizontal circle.

In another embodiment of the apparatus of the present invention, the first cylinder may have at its inlet end a larger diameter than the diameter below such portion of the cylinder. This larger diameter would extend only to a point in the cylinder that is above the part of the first cylinder which is adjacent to the first baffle means. In another embodiment of the apparatus of the present invention, a second vertical hollow cylinder having a diameter that is smaller than the diameter of the first cylinder may be employed co-axially with said first cylinder. This second cylinder has an inlet at a point along the length of said first cylinder, this inlet being at an angle of about 90° with the axis of said second cylinder. Air or some other inert gas is passed through this second cylinder to be directed toward and against the upper surface of the second baffle means. The gas is deflected from the upper surface of the second baffle means and provides a means for forcing the solid particles falling against the upper surface of said second baffle means in a direction that is away from the second baffle means and towards the walls of the vessel which is being charged with the solid particles. This technique permits a more even and uniform distribution of the solid particles over the cross-sectional area of the vessel to be charged and provides a bed of solid particles which has less void space and, consequently, a greater density.

BRIEF DESCRIPTION OF THE DRAWINGS

Several figures accompany this document and will enable the reader to more easily understand the present invention.

Accompanying FIG. 1 presents an isometric view of a broad embodiment of the apparatus of the present invention.

FIG. 2 represents a cross-sectional view of the broad embodiment of FIG. 1 as seen from line 2—2.

FIG. 3 presents an isometric view of the bottom part of the apparatus depicted in FIGS. 1 and 2, which part has connected thereto a support and a plurality of elongated baffles or deflecting vanes.

FIG. 4 presents a cross-sectional view of the apparatus of FIG. 3 taken along line 4—4.

FIG. 5 presents an isometric view of an embodiment of the apparatus wherein a gas purge and angled elongated baffles or deflecting vanes are employed.

FIG. 6 is a partial elevation of the apparatus of FIG. 5, showing only in detail the second baffle means as seen along line 6—6.

FIG. 7 is an elevation of another embodiment of a second baffle means.

FIG. 8 is an isometric view of a preferred embodiment of the second baffle means.

FIG. 9 is a cross-sectional view of the embodiment of the second baffle means shown in FIG. 8 as seen along line 9—9.

DESCRIPTION

Figure 10:
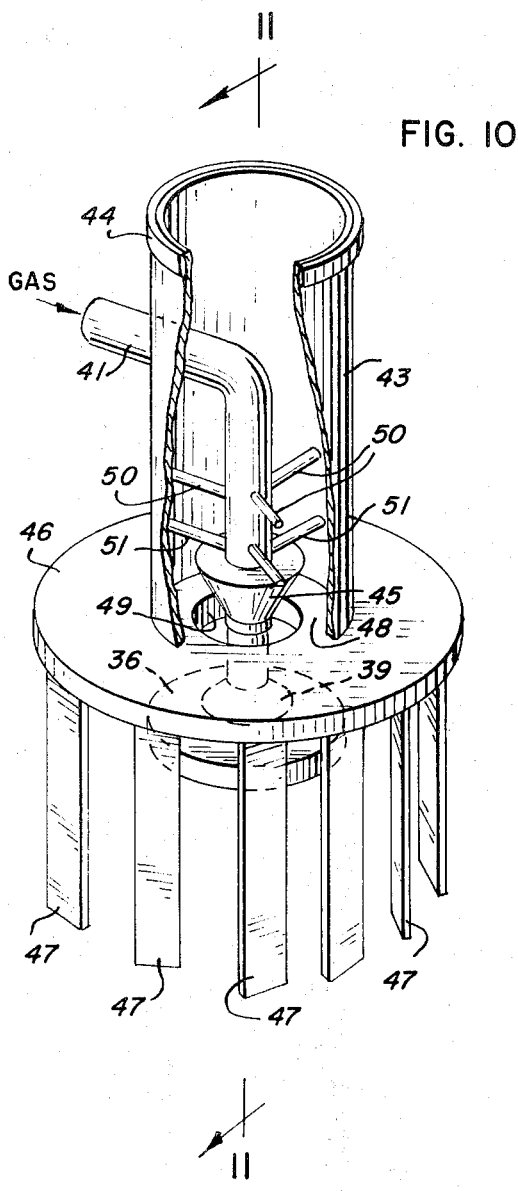
FIG. 10 is an isometric view of another embodiment of the apparatus of the present invention.

According to the present invention, there is provided an apparatus for distributing solid particles into a vertical vessel when such particles are being loaded into the vessel. This apparatus provides a means for attaining a bed of solid particles in that vessel, which bed is more uniform and has a greater density than that which would have been obtained if a prior-art method had been employed to charge the solid particles to the vessel.

In its broadest embodiment, the apparatus comprises: (1) a hollow first cylinder having an inlet end at its top and an outlet end at its bottom and having its axis in a vertical position; (2) a first baffle means located in said first cylinder near said inlet end and being positioned co-axially with said first cylinder, the diameter of said first baffle means being smaller than the inner diameter of said first cylinder; (3) a second baffle means located directly below said outlet end and being positioned co-axially with said first cylinder, the diameter of said second baffle means being at least as large as the inner diameter of said first cylinder; and (4) a third baffle means being co-axial with said first cylinder and having its top connected to the bottom of said first baffle means and its bottom connected to the upper surface of said second baffle means and its vertical sides connected to the inner wall of said first cylinder.

In some embodiments of the apparatus of the present invention, the first baffle means may be a conical baffle having its vertex pointing toward said inlet end of said first cylinder. In other embodiments, the first baffle means is an inverted conical baffle.

The second baffle means may be a conical baffle or, as described hereinbelow, it may be a horizontal plate, a combination of a conical section and a plate section, or a combination of two conical sections.

The third baffle means may be a three-sided vertical baffle having a 120-degree angle between adjacent sides. On the other hand, the third baffle means may be a second hollow cylinder through which a gaseous medium is passed to the bottom of the apparatus where it is directed away from the axis of the second cylinder toward the wall of the first hollow cylinder, as described hereinbelow.

In a broad embodiment of the apparatus of the present invention, there is provided an apparatus which comprises: (1) a hollow first cylinder having an inlet end at its top and an outlet end at its bottom; (2) a first conical baffle located in said first cylinder near said inlet end and having its vertex pointed towards said inlet end and being positioned co-axially with said first cylinder, the diameter of the base of said first conical baffle being smaller than the inner diameter of said first cylinder; (3) a second conical baffle located directly below said outlet end and being positioned co-axially with said first cylinder, the diameter of the base of said second conical baffle being at least as large as the inner diameter of said first cylinder; and (4) a three-sided vertical baffle being co-axial with said first cylinder and having its top connected to the bottom of said first conical baffle and its bottom connected to the upper surface of said second conical baffle and its vertical edges connected to the inner wall of said first cylinder, the angle between adjacent sides of said vertical baffle being 120°. This broad embodiment of the apparatus of the present invention is depicted in FIG. 1.

As depicted in FIG. 1, the first cylinder 1 is shown to have cylindrical walls 2, inlet end 3, and outlet end 4. First conical baffle 5 is located near the inlet end 3 and is positioned within first cylinder 1 so that it is co-axial with first cylinder 1. First conical baffle 5 has its bottom side or base connected to a three-sided vertical baffle 6, which in turn has its vertical edges 7, 8, and 9 connected to the side wall 2 of first cylinder 1. Vertical baffle 6 extends from the base of first conical baffle 5 down through the remaining length of first cylinder 1 and outside of outlet end 4 to the top of second conical baffle 10. Vertical baffle 6 has the bottom edges of its three sides connected to the upper surface of second conical baffle 10. These bottom edges are numbered 11, 12, and 13. A cross-sectional view of this embodiment, as seen from line 2—2 is represented in FIG. 2.

As indicated hereinabove, the apparatus of the present invention is employed in the vertical position. For example, when the broad embodiment of FIG. 1 is used, the solid particles to be charged through the apparatus are contained in some type of hopper which is located above the apparatus and which is connected to it by a hose, duct, or conduit. The hopper and hose or duct are not shown in the figures. Solid particles are permitted to fall from the hopper through the hose into first cylinder 1. These falling solid particles either contact the top surface of first conical baffle 5 or fall between the three sides of vertical baffle 6. Those particles contacting the top surface of conical baffle 5 are substantially uniformly deflected from first conical baffle 5 toward the cylindrical wall 2 of the first cylinder 1 and are evenly distributed between the three columns provided by the three sides of vertical baffle 6. The particles continue their fall through first cylinder 1 until they contact the upper surface of second conical baffle 10. Then the solid particles are deflected from the top surface of second conical baffle 10 and are directed towards the wall of the vessel which surrounds this apparatus and which is being charged with the solid particles falling through this apparatus. The particles coming from this apparatus are distributed in a relatively uniform and even manner over the cross-section of the area of the vessel being charged with the solid particles.

Suitably, the apparatus of the present invention may be used to charge solid catalyst particles to a reactor. Such catalyst particles may be either spherical or cylindrical in shape. The diameter of such particles may range advantageously from about one-sixty-fourth inch to about one-fourth inch. In the case of particles having a cylindrical geometry, the ratio of length to diameter may be as large as 8:1.

The apparatus in FIG. 1 may be augmented by having attached to it near the outlet end 4 a support 14, as shown in FIG. 3. This support 14 may have a circular cross-sectional area, but this is not a requirement. From support 14, extend a plurality of elongated baffles or deflecting vanes 15. These deflecting vanes 15 may be connected such that they make no essential angle with the tangents of a circle in the horizontal plane of the support. However, they may be connected in such a manner that they do make an angle with the tangents as shown in FIG. 3. It is also shown, and in a more clear manner, in FIG. 4, which represents a cross-sectional view of the apparatus shown in FIG. 3 at line 4—4. While the support 14 need not have a circular cross-section, it is mandatory that the deflecting vanes 15 be positioned with one another along the periphery of a circle. This is shown in FIG. 4.

The elongated baffles or deflecting vanes are employed conveniently in such a manner that either each makes an angle with the vertical axis of the first cylinder or, as described hereinabove, each makes an angle with the tangent to a circle having its center at the vertical axis of the support and its radius extending from such axis of the point of junction of the deflecting vane and the support, or both. In either case, the angle may vary from 0° to about 45°, preferably about 20°. This type of positioning permits a more uniform and even distribution of solid particles, as they are deflected from the second conical baffle 10 toward these deflecting vanes 15.

Also shown in FIG. 4 is a cross-sectional view of the three-sided vertical baffle 6. As pointed out hereinabove, adjacent sides of this vertical baffle 6 form with one another an angle of 120°. When this support 14 and its attached deflecting vanes 15 are employed in the apparatus of the present invention, solid particles deflected from second conical baffle 10 are directed outwardly from the axis of second conical baffle 10 toward the deflecting vanes 15 and the wall of the vessel to be filled with the solid particles. Some of these solid particles pass between the deflecting vanes and fall to the surface of the bed of solid particles being formed. Other solid particles being deflected from the upper surface of said second conical baffle 10 strike the sides of deflecting vanes 15 and are directed downwardly to the top of the bed of solid particles being formed. As a result, a more even and uniform distribution of the solid particles falling toward the bottom of the vessel to be filled is attained.

In another embodiment of the apparatus of the present invention, a gaseous medium is employed to provide additional means of spreading solid particles over the cross-sectional area of the vessel to be charged. An example of this embodiment is presented in FIG. 5. Vessel 16 is composed of at least two chambers, cylinders 17 and 18. Cylinder 17 is located near the inlet end of vessel 16 and has a larger diameter than cylinder 18, which is located at the outlet end of vessel 16. Pipe 19 extends into cylinder 17 and is perpendicular to the axis of cylinder 17. After a 90° bend, pipe 19 becomes co-axial with cylinder 17. At the bottom of cylinder 17, but prior to entry into cylinder 18, there is positioned co-axially an inverted conical baffle 20, which is slidably connected to pipe 10. The diameter of the base of conical baffle 20 may be either larger than or smaller than the inner diameter of cylinder 18 and baffle 20 may be moved up or down along pipe 19 to vary the space between baffle 20 and the inner diameter of cylinder 18 and, thus, regulate or control the flow of particles through such space as the particles pass downwardly through vessel 16. Conical baffle 20 can be moved up or down and held in a fixed position by arm 21, or some other suitable means. Arms or braces 22 position pipe 19 within cylinder 17 and hold it in a fixed position with respect to cylinder 17. At least three braces 22 are required. When three are employed, they are spaced from each other at angles of 120° in the same horizontal plane. Such braces securely hold pipe 19 in a fixed position co-axially with cylinder 17.

Pipe 19 extends from the bottom or outlet end of cylinder 17 and is connected to conical baffle 23 as shown in FIG. 5 and in FIG. 6. The end of pipe 19 is plugged. A plurality of holes 24 are located in pipe 19 above its end and conical baffle 23. A sleeve 25 is movably connected to and encircles pipe 19 just above the plurality of holes 24. This sleeve 25 can be moved up or down to adjust the size of the space between sleeve 25 and the beveled top 26 of conical baffle 23. The diameter of the base of conical baffle 23 is at least as large as the inner diameter of cylinder 18. At least three braces 26 are employed to hold conical baffle 23 rigidly in position with clyinder 18, the conical baffle 23 and cylinder 18 being co-axial. A plurality of deflecting vanes 27 are connected to conical baffle 23 along the periphery of its base by suitable connecting means 28. Deflecting vanes 27 are connected so that they either make an angle with the vertical axis of cylinder 18 or make an angle with the tangents to the circular base of conical baffle 23, or both.

When in use, this embodiment of the apparatus of the present invention is employed in the vertical position. Solid particles are passed from a hopper through a hose, which hose is connected to the inlet end of the apparatus, that is, to the top of cylinder 17. The hopper and hose are not shown. The solid particles fall past pipe 19 and first conical baffle 20 into and through cylinder 18. The solid particles pass out of the outlet end of cylinder 18 toward conical baffle 23. Air, or any other suitable inert gas, is passed through pipe 19 and out of holes 24 to contact the solid particles falling from cylinder 18. The gas streams coming from holes 24 diffuse with one another as the gas passes through the channel 29 formed by the beveled edge of conical baffle 23 and sleeve 25. The gas then contacts the solid particles and forces them outward from the axis of said second conical baffle 23 and the axis of cylinder 18. The particles either pass through the openings between the deflecting vanes 27 or impinge upon the deflecting vanes 27 and are deflected downwardly toward the bottom of the vessel to be filled with the particles.

This embodiment of the apparatus of the present invention has been employed to charge a petroleum hydrocarbon reactor with a hydro-processing catalyst. The resulting density of the catalyst bed obtained by use of this embodiment of the apparatus was 44.7 pounds per cubic foot. For other catalyst beds loaded by the conventional man-guided "sock" technique, the average density was 40.0 pounds per cubic foot. Hence, the use of this apparatus will provide an improved bed density when loading solid particles to a vertical vessel.

Broadly, this embodiment of the apparatus for distributing solid particles into a vertical vessel, such as a reactor, when said particles are being charged into said vessel is an apparatus which comprises: (1) a hollow first cylinder having an inlet end at its top and an outlet end at its bottom and a restricted inside diameter at a point along its length; (2) a hollow second cylinder, said second cylinder being co-axial with said first cylinder and having an inlet at a point along the length of said first cylinder and near the inlet end of said first cylinder, said inlet of said second clyinder being at an angle of about 90° with the axis of said second cylinder, the outlet end of said second cylinder being below the outlet end of said first cylinder, the outside diameter of said second cylinder being smaller than the restricted inside diameter of said first cylinder; (3) an inverted conical baffle having a closed base and being concentric with said second cylinder and positioned near the restricted inside diameter of said second cylinder, the diameter of said base being larger than the outside diameter of said second cylinder, said conical baffle being movable along the length of said second clyinder to regulate the space between said baffle and said first cylinder at the restricted inside diameter of said first cylinder; (4) a second baffle means, which second baffle means is connected to said second cylinder at its outlet end; (5) a sleeve near the bottom of said second clyinder and extending around the outer circumference of said second cylinder; (6) a plurality of holes extending around the circumference of said second cylinder between said sleeve and the outlet end of said second cylinder; (7) a plurality of deflecting vanes, said deflecting vanes being connected to said second baffle means in such a manner as to deflect in a downward direction any solid particles impinging thereon; (8) a channel formed by said sleeve and the upper surface of said second baffle means, said channel being designed to lead away from the axis of said second cylinder toward said deflecting vanes; (9) a first connecting means fixing said second cylinder co-axially with said first cylinder; (10) a second connecting means fixing said second baffle means rigidly with said first cylinder; and (11) a third connecting means connecting said deflecting vanes with said second baffle means.

The second baffle means that is employed in the apparatus of the present invention, that is, the lower baffle means which is located at the outlet end of the cylindrical vessel, is shown hereinabove in FIGS. 1 through 6 as a conical baffle. However, it is to be understood that such baffle means could be a horizontal plate, particularly if a gas stream were directed over its upper surface. In one embodiment, as shown in FIG. 7, the hollow cylinder 30 contacts and is joined to a plate 31 at junction 32. The plane of plate 31 is perpendicular to the axis of the hollow cylinder 30. A slip collar or sleeve 33 is fastened to cylinder 30 near its outlet end and is just above the plate so that the bottom of the collar 33 and the upper surface of the plate 31 form a channel 34. A plurality of holes 35 are located in clyinder 30 between the plate 31 and the collar 33. Any gas passing down through the cylinder 30 will pass through the holes 35 and channel 34 to be directed away from the axis of cylinder 30.

In another embodiment, as shown in FIGS. 5 and 6 hereinabove, the lower or second baffle means is a conical baffle 23 which is connected to the lower end of cylinder 19. A slip collar or sleeve 25 forms a channel 29 with the beveled top of conical baffle 23. Holes 24 are located in cylinder 19 between slip collar 25 and baffle 23. Through these holes 24 and channel 29 pass a gaseous medium, as indicated hereinabove.

In still a different embodiment of this second baffle means, as shown in FIGS. 8 and 9, second baffle means 36 is composed of a conical section 37 and a plate section 38. Slip collar or sleeve 39 is shaped at an angle so that is is parallel to the upper surface of conical section 37 and forms a channel 40 with the upper surface of the conical section 37. In this embodiment, gas passing through cylinder 41 and the holes 42 is directed downwardly through channel 40 to be deflected by the upper surface of plate section 38 outwardly away from the axis of cylinder 41. This latter embodiment is a preferred embodiment of the gas-swept second baffle means of the apparatus of the present invention.

It is conceivable that the second baffle means could be composed of two conical sections. The sides of the upper conical section could make an angle of 45° with the horizontal, while the sides of the lower conical section could make an angle that is less than 45° with the horizontal. If this latter angle were very small, it would make the sides of the lower conical section approach the top of a horizontal plate section.

Figure 11:
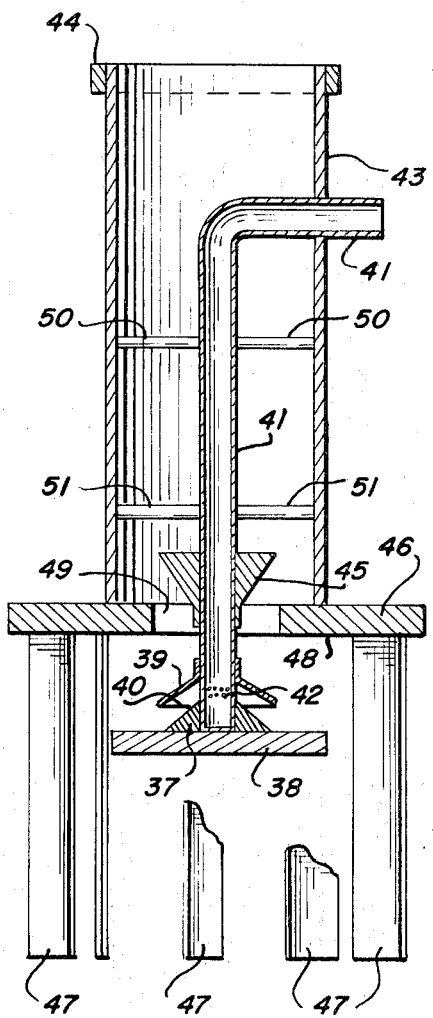
FIG. 11 is a cross-sectional view of the embodiment depicted in FIG. 10 as seen along line 11—11.

Another embodiment of the apparatus of the present invention is presented in FIGS. 10 and 11. The first cylinder 43 has at its inlet end a means 44 for connecting cylinder 43 to a sock or duct not shown. Such means 44 may be a cylindrical band. Gas pipe 41 has a 90-degree bend and extends down through and out of first cylinder 43. An inverted conical baffle 45 is located co-axially with gas pipe 41 near the outlet end of first cylinder 43. Support 46 is connected to the outlet end of cylinder 43 and has extending from its lower surface a plurality of deflecting vanes 47. In FIG. 11, some of the deflecting vanes 47 are broken away for clarity. Support 46 extends inwardly so that a ledge 48 is present at the bottom of cylinder 43. Inverted conical baffle 45, which may be made from a solid material or from a sheet material, is adjustable up or down so that the space 49 between it and the ledge 48 can be regulated to control the amount of solid particles passing through space 49. Gas pipe 41 has connected at its lower end the baffle means depicted in FIGS. 9 and 10. The gas pipe 41 is centered and held firmly by braces 50 and 51.

Solid particles to be charged to a vessel are passed through a hose from a hopper, which hose is connected to the apparatus at its inlet end by means of the lip formed by the cylindrical band 44. The solid particles flow into and through first cylinder 43 past inverted conical baffle 45 and through the annular space provided between gas pipe 41, conical baffle 45, and the aperture of support 46. This aperture is identified as aperture or space 49. Air, or a similar inert gas, is passed through gas pipe 41 and out of holes 42 into and through channel 40 to meet the solid particles falling from aperture 49. The gas flow pushes the solid particles toward the deflecting vanes 47 where said solid particles either pass through the spaces between deflecting vanes 47 or impinge upon deflecting vanes 47. Those particles contacting deflecting vanes 47 subsequently drop to the bottom of the vessel being filled with the solid particles. Those solid particles passing between the deflecting vanes 47 subsequently fall to the bed of solid particles forming on the bottom of the vessel to be charged with the solid particles. The baffle 45, the baffle means 36, and sleeve 39 are conveniently and appropriately connected to the gas pipe 41 by conventional means, such as set screws and the like.

It is to be understood that the examples and embodiments of the apparatus of the present invention described hereinabove are presented for purposes of illustration only and are not intended to limit the scope of the present invention.

The apparatus as described hereinabove provides an effective means for charging solid particles, such as catalyst particles, to a vertical vessel, such as a reactor. The resulting charged bed of solid particles will have a greater and more uniform density than those beds of solid particles that have been charged by conventional prior-art techniques.

What is claimed is:

1. An apparatus for distributing solid particles into a vertical vessel when said solid particles are being loaded into said vessel, said apparatus being designed for use in a substantially vertical position, which apparatus comprises: (1) a hollow first cylinder having an inlet end at its top and an outlet end at its bottom and having its axis in a vertical position; (2) a first baffle means located in said first cylinder near said inlet end and having its vertex pointed toward said inlet end and being positioned co-axially with said first cylinder, the diameter of the base of said first baffle means being smaller than the inner diameter of said first cylinder; (3) a second baffle means located directly below said outlet end and being positioned co-axially with said first cylinder, the diameter of the base of said second baffle means being at least as large as the inner diameter of said first cylinder; and (4) a third baffle means being co-axial with said first cylinder and having its top connected to the bottom of said first baffle means and its bottom connected to the upper surface of said second baffle means and its vertical sides connected to the inner wall of said first cylinder.

2. The apparatus of claim 1 wherein said third baffle means is a three-sided vertical baffle, the angle between adjacent sides of said vertical baffle being 120°.

3. The apparatus of claim 1 wherein said first baffle means is a conical baffle.

4. The apparatus of claim 1 wherein said second baffle means is a conical baffle.

5. The apparatus of claim 1, which apparatus comprises further a support connected co-axially to said first cylinder near said outlet end and a plurality of deflecting vanes connected to said support and extending downward therefrom, said deflecting vanes being positioned such that a portion of said solid particles coming from said outlet end of said first cylinder and contacting the upper surface of said second baffle means will be directed against and deflected from such deflecting vanes in such a manner as to fall more evenly and uniformly over the cross-sectional area of said vertical vessel.

6. The apparatus of claim 2 wherein said first baffle means and said second baffle means are conical baffles.

7. The apparatus of claim 5 wherein said deflecting vanes are capable of being adjusted to provide an angle between each of said deflecting vanes and the tangent to a circle having its center at the vertical axis of said support and its radius extending horizontally from said vertical axis of said support to the junction of the deflecting vane and said support.

8. The apparatus of claim 5 wherein said deflecting vanes are capable of being positioned to provide an angle between each of said deflecting vanes and the vertical axis of said first cylinder.

9. The apparatus of claim 6 wherein said deflecting vanes are capable of being positioned to provide an angle between each of said deflecting vanes and the vertical axis of said support.

10. An apparatus for distributing solid catalyst particles into a reactor, which apparatus is designed for use in a substantially vertical position, which apparatus comprises: (1) a hollow first cylinder having an inlet end at its top and an outlet end at its bottom and a restricted inside diameter at a point along its length; (2) a hollow second cylinder, said second cylinder being co-axial with said first cylinder and having an inlet at a point along the length of said first cylinder and near the inlet end of said first cylinder, said inlet of said second cylinder being at an angle of about 90° with the axis of said second cylinder, the outlet end of said second cylinder being below the outlet end of said first cylinder, the outside diameter of said second cylinder being smaller than the restricted inside diameter of said first cylinder; (3) an inverted conical baffle having a closed base and being concentric with said second cylinder and positioned near the restricted inside diameter of said second cylinder, the diameter of said base being larger than the outside diameter of said second cylinder said conical baffle being movable along the length of said second cylinder to regulate the space between said baffle and said first cylinder at the restricted inside diameter of said first cylinder; (4) a second baffle means, which second baffle means is connected to said second cylinder at its outlet end; (5) a sleeve near the bottom of said second cylinder and extending around the outer circumference of said second cylinder; (6) a plurality of holes extending around the circumference of said second cylinder between said sleeve and the outlet end of said second cylinder; (7) a plurality of deflecting vanes, said deflecting vanes being connected to said second baffle means in such a manner as to deflect in a downward direction any solid particles impinging thereon; (8) a channel formed by said sleeve and the upper surface of said second baffle means, said channel being designed to lead away from the axis of said second cylinder toward said deflecting vanes; (9) a first connecting means fixing said second cylinder co-axially with said first cylinder; (10) a second connecting means fixing said second baffle means rigidly with said first cylinder; and (11) a third connecting means connecting said deflecting vanes with said second baffle means.

11. The apparatus of claim 10 wherein said second baffle means comprises a conical baffle having a beveled edge at its top, said beveled edge comprising the bottom surface of said channel.

12. The apparatus of claim 10 wherein said second baffle means comprises a conical section and a horizontal plate section.

* * * * *

UNITED STATES PATENT OFFICE
CERTIFICATE OF CORRECTION

Patent No. 3,854,637        Dated December 17, 1974

Inventor(s) Karl A. Muller, Jr., et al.

It is certified that error appears in the above-identified patent and that said Letters Patent are hereby corrected as shown below:

Column 1, line 25, "from" should read -- form --.

Column 4, line 67, "cross-section of the" should read -- cross-sectional --.

Column 8, line 16, "is is" should read -- it is --.

Column 10, line 21, of claim 10, after "cylinder" insert -- , --.

Signed and Sealed this twenty-second Day of June 1976

[SEAL]

Attest:

RUTH C. MASON
Attesting Officer

C. MARSHALL DANN
Commissioner of Patents and Trademarks